Nov. 30, 1943.　　　　S. L. WILLIS　　　　2,335,371
METHOD OF MOLDING PLASTIC MATERIAL
Filed May 9, 1939
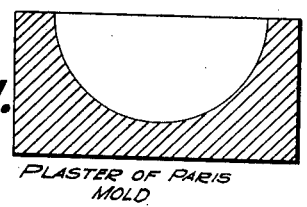
FIG.1. PLASTER OF PARIS MOLD
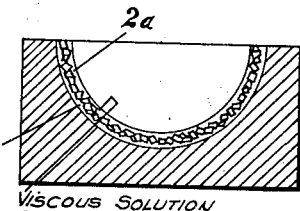
FIG.4. VISCOUS SOLUTION SECOND COATING
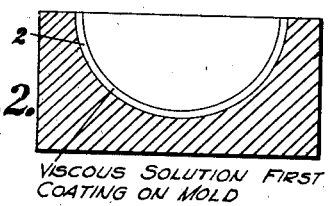
FIG.2. VISCOUS SOLUTION FIRST COATING ON MOLD
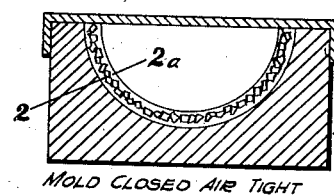
FIG.5. MOLD CLOSED AIR TIGHT
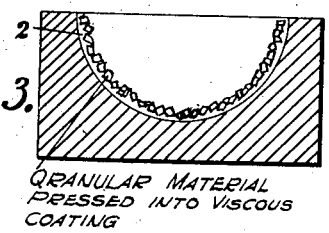
FIG.3. GRANULAR MATERIAL PRESSED INTO VISCOUS COATING
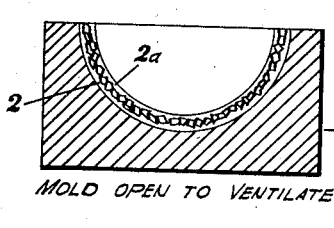
FIG.6. MOLD OPEN TO VENTILATE
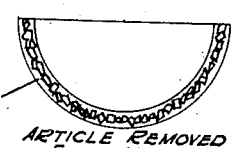
FIG.7. ARTICLE REMOVED FROM MOLD
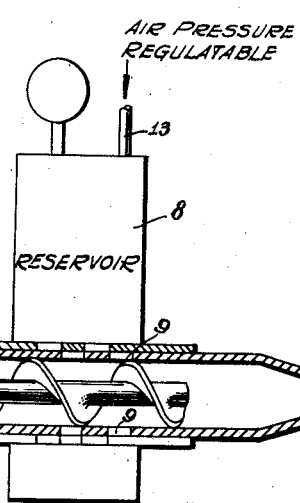
FIG.8.
INVENTOR
Sanford L. Willis
BY Hammond & Littell
ATTORNEYS Patented Nov. 30, 1943

2,335,371

UNITED STATES PATENT OFFICE 2,335,371

METHOD OF MOLDING PLASTIC MATERIAL

Sanford L. Willis, White Plains, N. Y.

Application May 9, 1939, Serial No. 272,544

9 Claims. (Cl. 18—55)

The present invention relates to an improved process of fabricating useful objects from resins and resinoids, commonly known in the industry by the general term "plastics," and has for an object to provide a process which can be operated expeditiously and effectively and which will produce molded articles of superior quality.

The invention has for a further object to provide a product which is strong and tough.

Another object is to provide a process wherein a plasticizer can be introduced effectively and economically into the product.

Another object is to provide a product in which product texture and opacity can be easily and accurately controlled.

The invention has been developed more particularly for the purpose of molding articles wherein a substantial but relatively thin wall of plastic material is molded against a mold surface and from which it is separated when the material sets or becomes firm.

The invention is also applicable and with particularly satisfactory results to the production of flat plaques and the like which can be molded against a flat mold.

The invention, however, is applicable to other types of molding and the particular description is to be understood as illustrative and not as defining the limits of the invention.

Another object is to provide an improved apparatus for mixing solid granular material with viscous liquid in predetermined proportions for use in the process of molding.

The process of the present invention is an improvement on the process described in the French patent to Mergier and Leroy, No. 830,986.

The nature and objects of the invention will be better understood from a description of illustrative embodiments for the purpose of which description reference should be had to the accompanying drawing forming a part hereof and in which—

Figure 1 is a sectional view of a mold in which a hollow object may be cast,

Fig. 2 is a similar sectional view but showing a coating of viscous solution applied to the mold, Fig. 3 is a view showing the granular material applied to the mold, Fig. 4 shows the second coating of viscous material as applied, Fig. 5 shows the mold closed for setting of the material, Fig. 6 shows the mold opened to ventilate and permit drying, Fig. 7 is a sectional view of the finished article removed from the mold, and Fig. 8 is a cross-sectional view showing diagrammatically an apparatus for use in mixing solid and viscous material for molding.

For the purposes of producing a hollow article such as indicated in the mold illustrated in Fig. 1, a mixture comprising solid granular material and a viscous solution may be applied against the walls of the mold to provide a mass of a thickness sufficient to provide the necessary strength, as for example a thickness of an eighth or a quarter of an inch. A mass of suitable consistency may be produced by mixing in suitable proportions granular plastic material and a viscous solution of the same plastic or of a different plastic material in a volatile solvent in which the granular plastic is soluble. This mass may then be applied within the mold in any suitable manner.

In one embodiment of the invention, the mass is made of such consistency that it may be flowed into the mold and the mold rotated to flow the material against all sides of the mold, thereby causing the material to adhere to the walls of the mold in a layer of suitable thickness.

In some instances it may be desirable to rotate the mold whereby centrifugal force will aid in placing the material and in maintaining it against the walls while hardening.

In still another embodiment of the invention, the mixture may be added to the mold and subsequently spread over its surface in the same manner that clay is spread over a mold surface in the manufacture of earthenware and porcelain by means of a spreading tool which may or may not accurately form the free surface contour.

Such shrinkage as occurs as the solution evaporates will be in the direction of the thickness of the coating and will not interfere with the accuracy of definition of the molded article.

It is to be noted that the solid particles or granules of plastic material may swell during the absorption of the solvent from the solution into the solid material. In some applications of the invention, this should be taken into account in the proportioning of the solid and the solution.

In practice a previously compounded mixture of solid and solution may be applied to the mold surface 1 to form the molded article. Alternatively, a relatively thin coating of solution 2 may be applied as by flowing the solution into the mold and then draining to leave a suitable coating on the mold surface. The solid material 3 may then be applied in granular form as by filling the mold with granular material, letting it set for perhaps a minute or two or sufficient to cause effective adherence between the granular material and the coating of solution. The excess granular material may then be removed by simply inverting the mold. In this procedure dry granular material may be pressed into the first applied liquid. Certain advantages are obtained if a sufficient quantity of granular material is thus applied to form a firm matrix wherein the granules contact each other to prevent shrinkage of the matrix along the wall of the mold. Preferably a second coating of solution is applied to further cement the granular material and to provide additional mass and strength. The second coating may be more viscous if desired with certain advantages.

When forming articles in hollow molds, the consistency of the solution should be such that a reasonably even coating will be caused to adhere to the mold when the solution is poured into the mold and the excess is drained out.

It will be understood that in the making of plaques and many other flat articles the solution applied may be as thick as suits the conditions of operation. If the article is relatively flat and the effective mold surface may therefore be horizontal, the solution may be quite thick and viscous, and the dry granular plastic or other filling material may be pressed into the viscous coating as by a roller.

A cover member 4 is shown as applied to the mold in order that the mold may be closed to inhibit evaporation of solvent. In practice, after the mold has been closed for a suitable period of time to permit absorption of the solvent and plasticizer by the granular material, the mold may be ventilated either by removing the cover or by passing a current of air through the mold.

There are many important advantages in the process of the invention. It is an important feature that the solid granular material and the solution are combined in the mold and that the evaporation of solvent from the solution does not begin until the material has completely formed against the mold surface. The loss of solvent is much less and the process facilitates control of the texture and qualtiy of the product. The process eliminates premature action of the solvent on the granular material. By controlling the evaporation of solvent the most effective penetration of the granular material by the solvent and the plasticizer is obtained and a particularly effective bond is effected.

The total mixture as applied to the mold when the solution and solid are applied separately can be made more rich in solid material and yet the solution in contact with the mold can be effectively fluid to provide sharp definition against the mold surface. The loss of solvent in this process is substantially less than obtains when the solid and solution are mixed separately to obtain a pouring consistency and then applied to the mold. An effective fluidity of the separately applied solution is easily obtained with a relatively small amount of solvent. In contrast with this, in a pre-mixed composition it is necessary to use more solvent to obtain the required fluidity of the mixture because a substantial amount of solvent is absorbed by the solid granular material during even a short period of handling during mixing.

The same conditions which reduce the solvent loss also reduce shrinkage during setting and drying of the material.

It is one of the advantages of the process that inexpensive molds such as plaster of Paris molds with their surfaces suitably coated to prevent adherence can be used.

Various resins and resinoids are suitable for use in the process described; for example, the several cellulose esters and ethers, the several vinyl resins and the methacrylic ester polymers, such as the methyl, ethyl, propyl and butyl esters of poly methyl acrylic acid, the urea formaldehydes, phenol formaldehydes, polystyrols, suitable rubber derivatives as isomerized and chlorinated rubber, and various other synthetic and natural resins and gums having the property of dissolving to form viscous colloidal solutions.

The strength and general quality of the material is very much improved by the introduction of suitable plasticizers. The plasticizers may, if desired, be incorporated in both the solid and the solution. There are, however, definite advantages in incorporating the plasticizer in the solution and not in the granular material. During the molding operation a sufficient amount of the plasticizer will be effectively absorbed from the solution by the granular material to give the desired quality.

Various plasticizers may be used with the several resins. Examples of the composition of selected solutions will illustrate the principles involved.

The proportion of plasticizer will be varied to suit the requirements; usually 3 to 10% in the solution will be sufficient for the whole composition.

*Example 1.*—A suitable cellulose acetate solution may contain 30% cellulose acetate, 65% acetone and 5% dimethylphthalate.

This solution may be used in combination with granular cellulose acetate or with other cellulose esters or ethers with which the solvent and the plasticizer will act satisfactorily.

*Example 2.*—A cellulose ether solution for use with various granular cellulose ethers or esters may contain 25% ethyl cellulose, 2½% triphenyl phosphate, 2½% dibutyl phthalate and 70% acetone.

*Example 3.*—A vinyl resin composition may be produced by combining a solution containing 25% of the vinyl resin, sold under the trade-mark Vinylite, 70% acetone and 5% tri-ethylene glycol di-2-ethylbutyrate with a similar vinyl resin in granular form.

The vinyl resins defined in the patent to Reid #1,935,577, granted May 17, 1928, are very effective for use in the process.

*Example 4.*—A solution of 25% methacrylate, 70% toluene and 5% tri-ethylene glycol di-2-ethylbutyrate may be combined with granular methyl methacrylate or other suitable methacrylate.

*Example 5.*—A solution of 30% ethyl polystyrol, 65% toluene and 5% diphenyl phthalate may be used with granular ethyl or other similar polystyrol.

*Example 6.*—A polystyrol solution may contain 25% polystyrol, 70% acetone or toluene and 5% tri-ethylene glycol di-2-ethylbutyrate.

In Fig. 8 is shown diagrammatically an apparatus which will facilitate mixing of the solid and liquid solution immediately before delivery for use in order that the material may be fed to the mold while freshly mixed. As shown, a hopper 5 carries a charge of granular material which may be fed forward into the discharge tube 6 by screw conveyor 7. A reservoir 8 is provided for liquid solution which may be discharged through the ports 9 to the delivery tube 6. The ports 9 are controlled by a suitable sleeve valve 10 which is moved to open position whenever the feed screw 7 is operated to feed granular material. As shown conventionally, a clutch 11 controlling the drive of the feed screw is connected by a link 12 to move the sleeve valve to open position when the clutch is connected and to move the sleeve valve to closed position when the clutch is disconnected. A connection is indicated at 13 to permit air pressure to be applied to the solution to facilitate and regulate the flow thereof.

As contrasted with mechanical mixing which requires substantial time, the apparatus provides means for forcing the solution under pressure into and through the granular material to provide effective mixing while the solid material is confined in the delivery tube. The rate of feed of both the solid and the liquid can be regulated to provide the proportions desired for a particular operation.

The foregoing particular description is illustrative merely and is not intended as defining the limits of the invention.

I claim:

1. The method of producing a molded object from a plastic composition which comprises applying a coating of a viscous solution of a plastic composition to a mold, and then adding granular material capable of absorbing solvent from said viscous solution.

2. The method of producing a molded object from a plastic composition which comprises applying a coating of a viscous solution of a plastic composition to a mold, adding granular material capable of absorbing solvent from said viscous solution, closing the mold to inhibit evaporation of the solvent while the granular material absorbs solvent and thereafter ventilating the mold to facilitate evaporation of excess solvent.

3. The method of producing a molded object as defined in claim 1, wherein granular material of sufficient quantity to form a substantially continuous matrix is forcibly pressed into the coating of viscous solution.

4. The method of producing a molded object from a plastic composition which comprises applying a coating of a viscous solution of a plastic composition to a mold, adding granular material capable of absorbing solvent from said viscous solution, and applying a second coating of viscous solution.

5. The method of producing a molded object from a plastic composition which comprises applying to a mold a coating containing a viscous solution of a plastic material and granular plastic material which is soluble in the solvent of the viscous solution, closing the mold to inhibit evaporation of the solvent for a time sufficient to permit the granular material to absorb solvent from the viscous solution, and then ventilating the mold to evaporate excess solvent.

6. The method of producing a molded object from a plastic composition which comprises applying to a mold a coating consisting of a plasticizer and a plastic material dissolved in a suitable solvent, together with granular plastic material, the granular plastic material and the plastic material of the viscous solution being of substantially the same composition, closing the mold to inhibit evaporation for a period of time sufficient to permit absorption of solvent from the viscous solution by the granular plastic material and thereafter ventilating the molded material.

7. The method of producing a molded object from a plastic composition which comprises applying to a mold a viscous coating consisting of a plastic composition, a solvent and a plasticizing agent for said plastic material, thereafter applying to said viscous coating granular material of the same composition as said plastic material, the relative quantities of granular plastic material and of viscous solution being such that the granular material will absorb sufficient solvent from the viscous material to provide a solid self sustaining composition against said mold, and closing the mold to inhibit evaporation of solvent and to permit absorption of solvent and plasticizer from the viscous coating by said granular material.

8. The method of producing molded objects from plastics which comprises applying to the face of a mold as a coating a mixture containing a viscous solution of a plastic and a plasticizer in a solvent together with a solid granular plastic soluble in said solvent and capable of absorbing the plasticizer, letting the mixture remain in the mold for a sufficient time to permit hardening of the mixture by absorption of the solvent and the plasticizer by the granular plastic, and removing the hardened article from the mold.

9. The method of producing molded objects from plastics which comprises applying to a mold a coating containing a viscous solution of a plastic and a plasticizer in a volatile solvent and admixed therewith in a quantity sufficient to form a substantially continuous matrix a solid granular plastic soluble in the volatile solvent, closing the mold for a time sufficient to permit absorption of solvent and plasticizer from the viscous solution by the granular material to harden the coating, ventilating the mold to evaporate the solvent, and removing the molded object from the mold.

SANFORD L. WILLIS.